No. 815,021. PATENTED MAR. 13, 1906.
D. J. KELLY.
APPARATUS FOR SEPARATING OR FILTERING SLIMES.
APPLICATION FILED MAY 8, 1905.
2 SHEETS—SHEET 1.
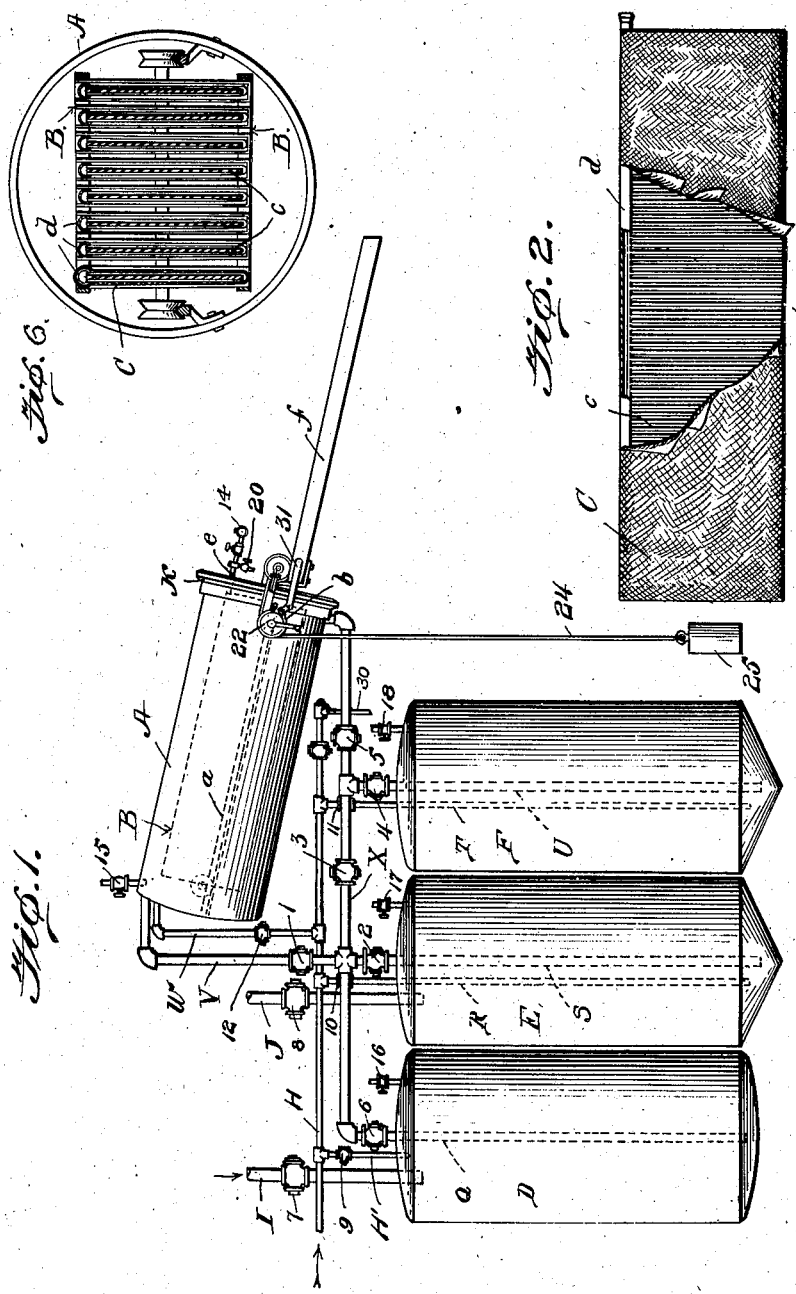
Witnesses
Inventor
David J. Kelly
by George H. Strong
his Attorney

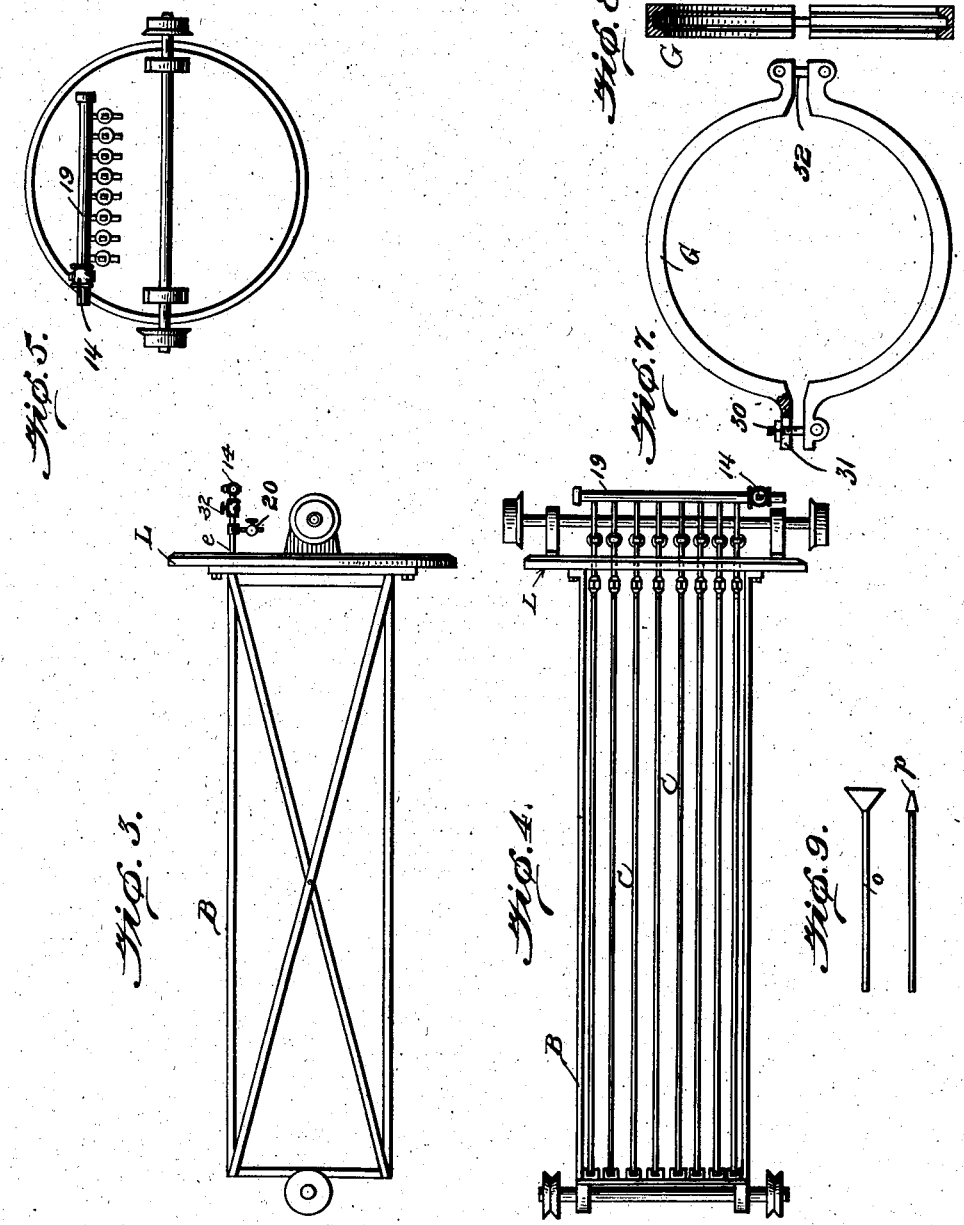

UNITED STATES PATENT OFFICE.

DAVID J. KELLY, OF SALT LAKE CITY, UTAH.

APPARATUS FOR SEPARATING OR FILTERING SLIMES.

No. 815,021.  Specification of Letters Patent.  Patented March 13, 1906.

Application filed May 8, 1905. Serial No. 259,424.

*To all whom it may concern:*

Be it known that I, DAVID J. KELLY, a citizen of the United States, residing at Salt Lake City, in the county of Salt Lake and State of Utah, have invented new and useful Improvements in Apparatus for Separating or Filtering Slimes, of which the following is a specification.

My invention relates to an apparatus designed especially to separate slimes from which precious metals have been dissolved and the liquid which holds the precious metals in solution; and my invention consists of the parts and the constructions and combinations of parts, which I will hereinafter describe and claim.

In the accompanying drawings, forming part of this specification, and in which similar characters of reference indicate like parts throughout the several views, Figure 1 is a side elevation of a slime-filtering apparatus embodying my invention. Fig. 2 is a plan view of a filter-frame removed, showing parts broken away. Fig. 3 is a side view of a filter-carrier. Fig. 4 is a plan view of Fig. 3, showing filter-frames in position. Fig. 5 is an end view of the carrier. Fig. 6 is a cross-section of the filter-tank and filter-frames. Figs. 7 and 8 are details to be referred to. Fig. 9 represents view of the nozzle $p$.

In the cyanid process, for example, when gold or silver bearing slimes are mixed or brought into contact with a cyanid solution the precious metals are dissolved and carried in the liquid in a state of solution. To recover these precious metals by effecting a separation of the metal-bearing solution from the worthless solid matter or slime-tailings by a filtering process is the essential object of the present invention.

In carrying out my invention I employ a filter which I have found particularly useful for metallurgical work; but to this particular use the filter is not limited, since it may be successfully employed in other fields and substantially wherever the separation of solids from fluid matter is desired.

The filter includes a stationary tank A, set, preferably, at an incline and having a general cylindrical form, although it may have any other desired and suitable cross-sectional shape. This cylinder has one of its ends, preferably the higher one, permanently closed, while the opposite or lower end is capable of being opened and closed for the purpose of introducing and removing the filter-frames. As my process involves substantially a filtration under pressure, I make the tank sufficiently strong to resist the necessary applied pressure.

Extending along the inner sides of the tank are appropriate track-rails $a$, upon which travel the wheels of a carrier B, having a substantially rectangular form, as shown in Figs. 3, 4, and suitably interiorly braced. The carrier is connected with or made a part of the lower or movable head of the tank, and it is designed to support and carry the filter-frames, which latter the wheeled carrier, and the removable head of the tank constitute substantially a unitary structure, since the several parts are so related that they may be positioned and removed relative to the tank, although the filter-frames proper are so connected to the carrier that they may be removed for cleaning when desired and additional frames substituted.

The filter-frame I prefer to make in the form of substantially rectangular bags or sacks C, interior to which are placed means for holding the sides of the bags or sacks apart and to prevent their collapsing under the pressure which I prefer to employ in carrying out the object of my invention and also to provide the necessary interior space for the free movement of separated or filtered liquid.

Various internal means may be adopted for resisting the external pressure upon the sides of the bags or sacks, and a simple and yet effective means may be the plate $c$, (shown in Fig. 2,) which has corrugations in its surface forming channels along which the filtered liquid will flow. A woven wire or other foraminous interior plate may be substituted with good results for the corrugated plate. When using the corrugated plate, the several fluid-channels formed by the corrugations may each connect with a slot in a longitudinally-extending pipe $d$, whereby the latter serves as a common conduit or conveyer for all liquid passing through the bags or fibrous sides of the filter-frames and into and along the corrugations.

In substance the filters are merely canvas or fibrous bags, the sides of which are held sufficiently apart to admit filtration, said bags being completely closed and admitting nothing to pass from the outside except through the interstices in the canvas or other flexible material or through the open end of the pipe $d$, which latter has its open end connected by a coupling or union to a pipe e, which passes through the lower removable head of the tank A. By reason of the foregoing construction when the filter-frames are in position in the tank and the mixture of slimes and solution is admitted to the tank under pressure the clear liquid will be driven through the bag or fibrous sides of the filter and will flow along the corrugations of the interior plate into the pipe d and be delivered outside the tank, while the solid matter containing the precious metals will be collected upon the outside of the bags or fibrous sides of the filter.

The tank A may be supported upon any suitable form of framework, (not shown,) and in line with the internal track-rails is an inclined track or surface f, upon which the wheeled carriers B travel when being removed from or introduced into the pressure-tank, as I will hereinafter describe.

E represents a pressure-tank, into the upper head of which a pipe J leads from some slime-supply, preferably a tank above, (not shown,) said pipe having a controlling-valve 8, which is opened to admit the slimes-pulp to fill the tank. When the tank E is filled, the overflow will pass through the pipe S and into and along the pipe X, whose valve 3 will then be open and will enter a second tank F through a valve-controlled pipe U. With the tanks E and F filled and the valves 3 and 5 of pipe X open the slime-pulp is permitted to pass along the pipe X and enter the filter-tank A, which is in turn filled, thereby completely submerging the contained filter-frames. In filling the filter-tank provision is made in the form of an air-cock 15 for permitting the escape of the displaced air in the tank and for indicating when the tanks all are full, similar means 17 18 being provided the tanks E and F, respectively, for the escape of the air displaced by filling these tanks with the slime-pulp.

A pipe H leads from some suitable compressed-air supply, and valve-controlled branches lead from this pipe and connect with the several tanks. In the tanks E F these branches R T extend to a point near the bottom of the tank and close to the slime-pipes S U. The slime-pipe also has a branch V, which is in line with the pipe S of tank E and connects with the filter-tank at its upper end, said branch having a controlling-cock l, and the compressed-air pipe has a branch W, also connecting with the upper end of the filter-tank and having a controlling-cock 12.

The operation of the apparatus as thus far described may be stated generally to be as follows: In starting filtration the valves 1 2 3 4 on the slime-line are opened, likewise the air-valve 11 in the branch pipe T, leading into the tank F, whereby the compressed air passes down the pipe T and issues from the lower end, near the bottom of the tank, and rises in the tank in the form of bubbles, which serve to maintain the slime in this tank in a state of agitation. The air-pressure in this tank F forces the slime through pipe U and opens valves 4, 3, and 1 in the order named and thence along pipe V into the filter-tank A. In this tank separation of liquid from solid matter occurs and the clear liquid finally escapes through the pipe d, while the solid matter cakes or collects upon the outer sides of the filter-bags C. As it is necessary to prevent the slimes from settling and accumulating on the bottom of the tank A, I prefer to incline this tank so that the settlings will gravitate to the lowest point of the tank, and this accumulated slime may be drawn off when desired by closing the air-valve 11 and slime-valve 3 and opening the air-valve 10 to allow the filter-tank to receive a slime-supply direct from the tank E through the pipe V. Now allow the accumulated compressed air in the top of the tank F to escape by opening the air-cock 18 thereof and then open the valve 5 of slime-supply pipe X and the slimes will pass out of the lower end of the filter-tank A through the pipe X and into the tank F through pipe U, the amount of slime thus passing into the tank F being displaced by a supply from the tank E flowing into the higher or upper end of the filter-tank, thereby producing practically a circulation in the filter-tank and preventing an accumulation of slimes in this tank, except what is collected upon the exterior of the bags or filtering sides of the filter-frames. The valves 5 and 8 can again be closed and the air-cock 17 in tank E opened to permit the escape of accumulated compressed air in the top of this tank, when the slime-pulp in tank F will pass through the pipe U and along pipe X and down pipe S and at the same time up pipe V and into the filter-tank. In general it can be said that by a proper manipulation of the several valves a circulation of the slimes may be obtained in the filter-tank and at the same time bringing fresh agitated slime-pulp in contact with the filters, which pulp enters the higher end of the tank A and after coming in contact with the filter sides is drawn off at the lower portion of the tank. When sufficient slime has accumulated on the canvas or other fibrous sides of the filters, the slime-supply is cut off by closing the valves 2 and 3 and the air-controlling pressure in either of the tanks E and F.

The tank D contains water or a weak leaching solution which is admitted through the pipe I, having a controlling-valve 7, said tank having a branch Q of the slime-pipe X entering its top and extending to a point near the bottom, said branch pipe Q having a controlling-valve 6. A branch H' of the compressed-air pipe H also enters the tank D and has the controlling-valve 9. Now when the valves 6 and 9 are opened the air-pressure in the tank D forces the water or weak solution out of this tank and into the filter-tank, the valves 2 and 3 being now closed and the valves 1 and 6 being open. At the same time the excess of slime-pulp in the tank A is drawn off back into the tank F, being displaced by the solution from the tank D. The accumulated slime on the filters is built up to make an evenly-resisting mass, the pressure having been the same at all points on the filter during the building up, and said built-up mass is in a condition to be uniformly leached by the solution from the tank D. After sufficient leaching the valve 6 is closed and the valve 12 is opened. The excess solution in the tank A is made to pass back to the tank D by opening the valves 5 and 8 (the valve 6 being then open) and closing the valves 1, 2, and 4. When all the liquid in the filter-tank is displaced by air, the valve 5 is closed and the air is forced through the slime on the filter, thereby drying the same, and when the slime is sufficiently dry the air-supply is shut off by closing the valve 12. The tank is then opened by the removal of its lower head and the accumulated slime removed from the sides of the filter-bags.

In Figs. 1, 4, 5, and 6 I illustrate the arrangement of a series of filters and a means by which I am enabled to move the carrier in and out of the filter-tank. As before stated, the carrier B has fixed to it the lower head L of the tank, which head fits into a flanged portion K at the lower end of the tank, and over this head and flange the two-part clamping-ring G of Fig. 7 is placed, it having an interior groove to embrace said flange and head. By loosening the nut on the pivoted bolt 30 of the clamping-ring and swinging the bolt out of the slot 31 in the clamp the two parts of said clamp may be opened out or separated about the hinged connection 32 and then removed from the tank, thereby unlocking the lower head. When this is done, the wheeled carriage with the attached head is free to pass down the internal tracks $a$ and out onto the exterior track $f'$ far enough to allow the slime to be removed from the filter-frames. In passing out of the filter-tank the carrier raises a weight 25, (of which there will be one on each side,) which is connected by a rope or connection 24 with the axis of the front rollers of the carrier B, said rope having one or more turns around a pulley 22, journaled on the outside of the tank A and having a strap or band-brake $b$ around its outer end controlled by a lever 31. The pulley 22 is provided with a crank-handle by which it may be turned to raise the weight and allow the carrier and filter-frames to emerge from the tank when it is necessary to do so and when there is no accumulation of slime on the filter-frames. When there is no slime on the filter-frames, the weight 25 is heavy enough to pull the carrier and its adjuncts back into the tank A; but when the filter-frames are loaded with slime the extra weight of the latter is sufficient to elevate the weight, and no power is required to move the carrier in and out when the filter-press is operating.

When the carrier is removed from the tank A far enough to give free access to the filter-frames, the slime is removed, and for this operation I find the device of Fig. 9 very useful, said device consisting of a hollow pipe $o$, with a flattened nozzle $p$, which discharges a thin stream of compressed air when connected to an air-supply, as when it is connected by a base to the pipe 30, leading from the compressed-air-supply pipe H before described. The flattened nozzle is designed to be run between the caked slime and the canvas or fibrous material of the filter-frames and in this way detach the adhearing slime, which falls into a car or other suitable receptacle placed to receive it.

When the slime is removed, the canvas is further cleaned, if necessary, by directing a stream of water or solution against its sides, after which the brake is released and the weight 25 pulls the carrier and frames into the tank again, the clamp G is put in position and tightened, and the filter is ready for repeating the operation of collecting the slimes and separating the clear liquid.

In Fig. 6 one of the filter-frames is shown with its accumulated slimes. The slime can be of a thickness or the frames can be as close together as to leave a space between the frames sufficiently wide to provide for a circulation between them when slime has accumulated to maximum thickness.

The outlet-pipes $d$ of all the filters of the series are shown connected to a pipe 19, which is a simple and convenient arrangement if air, steam, water, or solution is to be forced into the inside of the filter-bags for the purpose of further cleaning them. The pipes $e$, which couple to the pipe $d$, are each provided with a valve 20, and the pipe 19 has a valve 14, which arrangement permits me to ascertain if the solution is clear—that is, to see if any slime is leaking through the filters—and if so to shut off the particular filter by means of the valve or cut-off 32, of which there is one in each of the said coupled pipes.

Having thus described my invention, what I claim as new, and desire to secure by Letters Patent, is—

1. In an apparatus for separating slimes from which precious metals have been dissolved, a means for recovering the precious metals in solution said means comprising a closed tank, a carrier slidably mounted therein said carrier containing a filter medium, means for supplying the slimes to the tank under pressure whereby the liquid carrying the precious metals in solution are forced through the filter while the worthless solid matter is collected upon the outside of the filter, and a pipe or conduit through which the separated liquid is delivered outside the tank.

2. In an apparatus of the character described the combination of a closed vessel, a slimes-supply connecting therewith and adapted to fill the tank with metal-bearing slimes under pressure, a carrier within and slidably mounted relative to the tank and a filter medium supported on the carrier so that it will be submerged in the slimes whereby the liquid carrying the precious metals in solution is separated from the slimes-tailings while the slimes are under pressure.

3. In an apparatus of the character described the combination of a closed tank or vessel, a filter supported therein out of contact with the inner walls, a movable carrier for the filter slidably mounted within and relative to the tank, means for filling the tank with metal-bearing slimes under pressure whereby the liquid bearing the metals in solution are driven through the filter and the worthless solid matter is collected upon the outside of the filter, and an outlet from the filter for the separated liquid.

4. In an apparatus of the character described the combination of an inclined, closed tank capable of holding slimes under pressure, a filter supported in the tank out of contact with the inner walls thereof said filter having fibrous filtering sides exposed to the slimes under pressure, a carrier for the filter said carrier being slidably mounted within and removable endwise from the tank, means for filling the tank and submerging the filter with slimes while under pressure whereby the liquid bearing the precious metals in solution is driven through said sides and thereby separated from the slime-tailings, and a pipe leading from the filter to the outside of the tank and forming a discharge for the filtered liquid.

5. In an apparatus of the character described the combination of an inclined closed tank capable of holding slimes under pressure, a carrier movably mounted in said tank, filter-frames supported on the carrier and having fibrous sides exposed to the slimes, means for filling the tank with slimes under pressure whereby the fluid matter is forced through said filter sides and the worthless solid matter accumulated on the outside of the filter, and means for delivering the separated fluid outside the tank, said tank having a removable closure at one end, allowing the withdrawal of the carrier and affording access to the filter-frames carried thereby.

6. In an apparatus of the character described, the combination of a tank closed on all sides except for one end, a carrier movable into and out of the tank, and carrying a member which forms a closure for the open end of the tank, means for rigidly securing said closure to the tank when the carrier is within the tank, filter-frames supported on the carrier and having fibrous filtering sides, means within the frames and supporting said sides from outside pressure, means for filling said tank with metal-bearing slimes under pressure whereby the fluid matter is driven through the filter sides and the worthless solid matter accumulates on the outside of the sides, means whereby the separated liquid is deliverable to the outside of the tank.

7. In an apparatus of the character described the combination of a tank closed on all sides except one end, a guideway in the tank, a carrier adapted to travel on said guideway, a closure for the open end of the tank, and means for securing said closure after the carrier is in position in the tank, a pressure-filter supported on the carrier out of contact with the inner sides of the tank, means for filling the tank with metal-bearing slimes under pressure whereby the liquid containing the metals in solution is forced through the sides of the filter, means within the frames supporting the filter sides against the pressure of the slimes, and means for conducting the separated liquid from within the frames to the outside of the tank.

8. In an apparatus of the character described the combination of a tank closed on all sides except one end, a movable closure for the open end of the tank, a carrier slidably mounted in the tank and having a pressure-filter supported out of contact with the inner sides of the tank, means for admitting slimes to the tank under pressure whereby the fluid matter is forced through the filter while the solid matter collects upon the outside of the filter, means for conducting the separated fluid to the outside of the tank, said tank being inclined to form a settling-chamber at the lower end, and means for removing the settlings in said chamber by pressure from within the tank.

9. In an apparatus of the character described, the combination of a closed tank, a pressure-filter within the same, a carrier for the filter said carrier movably mounted within and removable endwise from the tank, a slimes-tank and fluid-pressure means for filling the first-named tank with slimes under pressure whereby the fluid matter is separated from the solid matter.

10. In an apparatus of the character described the combination of a closed tank, a pressure-filter therein, a tank into which slimes are first delivered, an overflow-tank and a valved connection between the same and the slimes-tank, valved connection between the overflow-tank and the lower end of the pressure-filter tank whereby the latter may be filled from the overflow-tank, and communication may then be shut off between the overflow-tank and the pressure-filter tank, means connecting the overflow-tank with the upper end of the filled pressure-filter tank, and means for generating a pressure in the overflow-tank and agitating the slimes therein, and delivering said slimes while under pressure, into the upper end of the pressure-filter tank.

11. In an apparatus of the character described, the combination of a closed tank, a pressure-filter therein, said tank being inclined whereby a settling-chamber is formed in its lower portion, a tank adapted to contain slimes, a pipe connecting said slimes-containing tank with the lower end of the pressure-filter tank, an overflow-tank and a pipe leading thereto from the slimes-supply pipe, a compressed-air pipe having branches leading into the slimes-tank and overflow-tank, and means for cutting out the overflow-tank from the slimes-supply and the air-pressure, means for reducing the pressure in the overflow-tank and means for establishing connection between this tank and the lower portion of the pressure-filter tank, and means for delivering slimes under pressure direct from the slimes-tank to the upper portion of the pressure-filter tank for displacing the accumulations in the settling-chamber of the pressure-filter tank and conducting the settlings back to the overflow-tank.

12. In an apparatus of the character described the combination with a closed inclined tank containing a pressure-filter, of a series of closed tanks, one of which contains slimes, and another a leaching solution, pipe connections between the series of tanks and the filter-tank with valves by which any one or more of the series of tanks may be cut off from the others and from the filter-tank, a compressed-air pipe having valve-controlled branches leading into the series of tanks for inducing a pressure therein, a valve-controlled connection between the first-named pipe and the upper end of the filter-tank, and a valve-controlled connection between the said filter-tank and the compressed-air pipe.

13. In an apparatus of the character described the combination with means for supplying slimes under pressure, of an inclined tank closed except at one end, said tank having internal guide-rails, a carrier mounted on said rails, said carrier having a member adapted to form a closure for the open end of the tank, a filter supported on the carrier and comprising an open frame and filtering fabric inclosing the same, a plate within the frame and supporting the fabric sides of the filter against pressure from without said plate having a channeled surface forming runways for filtered liquid, and a pipe extending along the filter-frame and into which the several runways of the plate empty.

14. In an apparatus of the character described, the combination with means for supplying slimes under pressure, of an inclined tank closed except at one end, guide-rails within the tank, a carrier mounted on said rails and having its front end serving as a closure for the open end of the tank, means for removably locking this closure to the tank, a filter having fibrous sides and an internal plate supporting said sides and having runways for the filtered liquid, and a conduit extending along the filter into which the several runways of the plate empty.

15. In an apparatus of the character described the combination with an inclined tank closed except at one end and having internal guides, of a carrier mounted within the tank and having its front forming a closure for the open end of the tank, means detachably locking the closure to the tank, a track outside the tank and substantially in line with the internal guides, and a counterbalance connected with the carrier, said counterbalance having less power than the weight of the loaded filter and carrier and greater power than the weight of an empty filter and carrier.

16. In an apparatus of the character described the combination with means for supplying slimes under pressure, of an inclined tank, a carrier thereon, a pressure-filter on the carrier, and comprising a series of frames each having fibrous filtering-bags and an internal plate with runways for separated liquid, a conduit extending along each filter-frame and receiving the liquid from the runways, a pipe connecting with the outer end of each conduit and a test-cock for said pipe.

In testimony whereof I have hereunto set my hand in presence of two subscribing witnesses.

DAVID J. KELLY.

Witnesses:
C. W. JOHNSON,
V. P. HISKEY.